United States Patent [19]

Nagano et al.

[11] Patent Number: 6,008,545

[45] Date of Patent: Dec. 28, 1999

[54] ENGINE STARTING AND ELECTRICITY GENERATING APPARATUS INCLUDING 3-ELEMENTS TYPE INPUT AND OUTPUT MECHANISM COAXIAL WITH MOTOR/GENERATOR

[75] Inventors: Shuji Nagano, Toyota; Kojiro Kuramochi, Okazaki; Hatsuo Nakao, Gotenba; Hiroshi Tsujii, Mishima, all of Japan

[73] Assignee: Toyota Jidosha Kabushiki Kaisha, Toyota, Japan

[21] Appl. No.: 09/131,274

[22] Filed: Aug. 10, 1998

[30] Foreign Application Priority Data

Oct. 22, 1997 [JP] Japan ................................. 9-289844

[51] Int. Cl.$^6$ ..................................................... F02N 11/04
[52] U.S. Cl. ................................. 290/46; 290/1 C; 74/6
[58] Field of Search ............................... 290/1 C, 46, 47; 310/113; 74/6

[56] References Cited

U.S. PATENT DOCUMENTS

| | | | |
|---|---|---|---|
| 4,743,776 | 5/1988 | Baehler et al. | 290/31 |
| 4,862,009 | 8/1989 | King | 290/22 |
| 4,959,595 | 9/1990 | Nishimura | 318/138 |
| 5,117,931 | 6/1992 | Nishida | 180/65.2 |
| 5,126,582 | 6/1992 | Sugiyama | 290/46 |
| 5,132,604 | 7/1992 | Shimane et al. | 322/10 |
| 5,237,230 | 8/1993 | Sugiyama et al. | 310/113 |
| 5,285,111 | 2/1994 | Sherman | 290/4 C |
| 5,418,400 | 5/1995 | Stockton | 290/46 |
| 5,856,709 | 1/1999 | Ibaraki et al. | 290/45 |

FOREIGN PATENT DOCUMENTS 0 384 808 A1  8/1990  European Pat. Off. .

*Primary Examiner*—Nicholas Ponomarenko
*Attorney, Agent, or Firm*—Oliff & Berridge, PLC

[57] ABSTRACT

An apparatus including motor/generator whose axis is spaced from and parallel to engine crankshaft, 3-elements type input and output mechanism disposed coaxially with the motor/generator and having first rotary element connected to the crankshaft, second rotary element connected to output shaft of the motor/generator, and third rotary element, and first and second one-way clutches associated with the input and output mechanism, which is arranged such that speed V1 of forward rotation of the first rotary element by engine is reduced when the second rotary element is rotated forward with the third rotary element held stationary. The motor/generator is operated to rotate the second rotary element to start the engine, with the first one-way clutch inhibiting the reverse rotation of the third rotary element, and as an electric generator, with the first one-way clutch allowing the forward rotation of the third rotary element while the three rotary elements are rotated as a unit under an action of the second one-way clutch.

8 Claims, 3 Drawing Sheets

ENGINE STARTING AND ELECTRICITY GENERATING APPARATUS INCLUDING 3-ELEMENTS TYPE INPUT AND OUTPUT MECHANISM COAXIAL WITH MOTOR/GENERATOR

This application is based on Japanese Patent Application No. 9-289844 filed on Oct. 22, 1997, the content of which is incorporated hereinto by reference.

BACKGROUND OF THE INVENTION

1. Field of the Invention

The present invention relates in general to an apparatus for starting an engine and generating electricity, and more particularly to techniques relating to such an engine starting and electricity generating apparatus which is compact in construction with a reduced axial dimension thereof.

2. Discussion of the Related Art

U.S. Pat. No. 5,132,604 discloses an example of engine starting and electricity generating apparatus, which includes (a) an engine operated by combustion of a fuel and having a crankshaft, (b) a motor/generator disposed such that an axis of rotation of the motor/generator is spaced apart from and parallel to an axis of rotation of a crankshaft of the engine; (c) a planetary gear device of a single planetary type accommodated in a casing and including a carrier disposed coaxially with the engine and connected to the crankshaft, a sun gear connected to an output shaft of the motor/generator, and a ring gear, said planetary gear device operating to mechanically synthesizing and distributing forces among the carrier, sun gear and ring gear, and being arranged such that a speed of rotation of the carrier in a forward direction by operation of the engine is reduced when the sun gear is rotated in the same forward direction with the ring gear held stationary; (d) a ratchet mechanism interposed between the casing of the planetary gear device and the ring gear, and electrically controlled to inhibit the ring gear from rotating in a reverse direction opposite to the forward direction while allowing the ring gear to rotate in the forward direction; and (e) a one-way clutch interposed between the carrier and the sun gear, and operating to inhibit a speed V2 of rotation of the sun gear from being lower than a speed V1 of rotation of the carrier while allowing the speed V2 to be equal or higher than the speed V1, and wherein the motor/generator is used as an engine starter motor for starting the engine, and as an electric generator during operation of the engine.

In this engine starting and electricity generating apparatus, the single motor/generator is capable of starting the engine and generating electricity. When the engine is started, the rotating speed and torque of the motor/generator are respectively reduced and boosted by the planetary gear device, so that the boosted torque is transmitted to the engine for starting the engine. When the electricity is generated by the motor/generator, the carrier, sun gear and ring gear of the planetary gear device are rotated as a unit by the action of the one-way clutch, so as to prevent an excessively high speed of operation of the motor/generator. This apparatus may employ an inexpensive motor/generator which have relatively small mechanical and electrical capacities.

In the known engine starting and electricity generating apparatus as described above, the planetary gear device is disposed coaxially with the engine, whereby the apparatus tends to have a relatively large dimension in the axial direction of the engine. In a front-engine front-drive automotive vehicle, the engine is installed with its axis extending in the transverse direction of the vehicle. Therefore, it is not easy to dispose the planetary gear device coaxially with the engine, in the front-engine front-drive vehicle. Further, the one-way clutch interposed between the sun gear and the carrier of the planetary gear device is required to have a comparatively large torque capacity and an accordingly large size. This requirement increases the axial dimension of the engine starting and electricity generating apparatus, making it more difficult to install the apparatus on the front-engine front-drive vehicle.

SUMMARY OF THE INVENTION

It is therefore an object of this invention to provide an engine starting and electricity generating apparatus which is compact in construction and which has a reduced axial direction.

The above object may be achieved according to the principle of the present invention, which provides an engine starting and electricity generating apparatus comprising: (a) an engine operated by combustion of a fuel and having a crankshaft; (b) a motor/generator having an output shaft and disposed such that an axis of rotation of the motor/generator is spaced apart from and parallel to an axis of rotation of the crankshaft; (c) a three-elements type input and output mechanism including a first rotary element connected to the crankshaft, a second rotary element connected to the output shaft, and a third rotary element, the input and output mechanism operating to mechanically synthesize and distribute forces among the first, second and third rotary elements, and being arranged such that a speed V1 of rotation of the first rotary element in a forward direction by operation of the engine is reduced when the second rotary element is rotated in the forward direction with the third rotary element being held stationary; (d) a casing accommodating the three-elements type input and output mechanism; (e) a first engaging device, interposed between the casing and the third rotary element, for allowing at least the third rotary element to rotate in the forward direction while inhibiting the third rotary element in a reverse direction opposite to the forward direction; and (f) a second engaging device, interposed between two elements of the first, second and third rotary elements, for inhibiting a speed V2 of rotation of the second rotary element in the forward direction from being lower than the speed V1 of rotation of the first rotary (element while allowing the speed V2 to be equal to or higher than the speed V1, for inhibiting the speed V1 from being lower than a speed V3 of the third rotary element in the forward direction while allowing the speed V1 to be equal to or higher than the speed V3, or for inhibiting the speed V2 from being lower than the speed V3 while allowing the speed V2 to be equal to or higher than the speed V3, and wherein the motor/generator is operated as an engine starter motor to rotate the second rotary element while the first engaging device inhibits the third rotary element from rotating in the reverse direction, whereby the engine is cranked and started, the motor/generator being operated as an electric generator, during operation of the engine, with the first engaging device allowing the third rotary element to rotate in the forward direction, while the first, second and third rotary elements are rotated as a unit under an action of the second engaging device, and wherein the three-elements type input and output mechanism is disposed coaxially with the motor/generator.

In the engine starting and electricity generating apparatus of the present invention constructed as described above, the three-elements type input and output mechanism is disposed coaxially with the motor/generator whose axis is spaced apart from and parallel to the axis of the crankshaft of the engine. In this arrangement, the overall axial dimension of the assembly including the engine and the other components coaxial with the engine is significantly reduced. Further, the assembly including the motor/generator and the three-elements input and output mechanism has comparatively small axial and radial dimensions. Accordingly, this assembly can be disposed with a high degree of freedom in its positioning relative to the engine, and the apparatus as a whole may be made compact and small-sized.

The present apparatus can be suitably used on a front-engine front-drive automotive vehicle wherein the engine is disposed such that the axis of the crankshaft is parallel to the transverse direction of the vehicle. However, the present apparatus may be used on a front-engine rear-drive vehicle.

The motor/generator and the three-elements type input and output mechanism may be disposed on the housing of the engine. Where a torque converter and a transmission are disposed coaxially with the crankshaft of the engine, the motor/generator and the input and output mechanism may be disposed radially outwardly of the transmission such that the axis of the motor/generator and mechanism is parallel to the axis of the transmission. Alternatively, the motor/generator and the input and output mechanism may be disposed within the housing of the engine, at one of axially opposite sides of the engine which is remote from the torque converter.

According to one preferred form of the present invention, the three-elements type input and output mechanism consists of a planetary gear device of simple or single planetary type including a carrier, a sun gear and a ring gear as the first, second and third rotary elements, respectively, and the first engaging device includes a first one-way clutch which allows and inhibits the rotations of the ring gear in the forward and reverse directions, respectively, while the second engaging device includes a second one-way clutch interposed between the sun and ring gears.

In this preferred form of the apparatus wherein the second one-way clutch is interposed between the sun gear and the ring gear, the required torque capacity of the second one-way clutch is smaller than where the second one-way clutch is interposed between the carrier and the sun gear or the ring gear. Accordingly, the second one-way clutch can be small-sized and is available at a reduced cost. The use of the first one-way clutch as the first engaging device makes it possible to make the apparatus further compact in construction.

Although the planetary gear device of simple or single planetary type is suitably used as the three-elements type input and output mechanism, this mechanism may consist of a planetary gear device of double or dual planetary type, or a differential gear mechanism of bevel gear type. Where a planetary gear device of simple planetary type is used, it is desirable to connect the engine to the carrier, and connect the motor/generator to the sun gear. However, it is possible to connect the engine to the carrier, and connect the motor/generator to the ring gear. Where a planetary gear device of dual planetary type is used, the engine and the motor/generator are connected to the ring gear and the sun gear or carrier, respectively. Where the differential gear mechanism of bevel gear type is used, the engine is connected to the differential case, while the motor/generator is connected to one of a pair of side gears.

While a one-way clutch is preferably used as the first engaging device, it is possible to use an electromagnetically or hydraulically operated clutch for selective connection and disconnection of the casing and the third rotary element to or from each other. In this case, the casing and the third rotary element are connected to each other by the clutch, so as to inhibit the rotation of the third rotary element, when the engine is started by the motor/generator. When the motor/generator is operated as an electric generator for charging an electric energy storage device such as a battery, the clutch is released to disconnect the casing and the third rotary element so that the third rotary element is freely rotatable. Although the use of a one-way clutch as the second engaging device is also preferred, an electromagnetically or hydraulically operated clutch may be used.

The one-way clutch used as the first and second engaging devices may preferably be a sprag clutch or a roller type one-way clutch, which is mechanically and automatically allowed to rotate relative to each other in one of opposite directions and inhibited to rotate relative to each other in the other direction, and which has a relatively small resistance to the relative rotation. However, a ratchet mechanism disclosed in U.S. Pat. No. 5,132,604 may also be used as the first and second engaging devices.

The first rotary element of the three-elements type input and output mechanism disposed coaxially with the motor/generator may be connected to the crankshaft of the engine through a suitable power transmission mechanism including sprockets and a chain, or a gear train.

According to another preferred form of this invention, the first engaging device is disposed coaxially with and between the motor/generator and the three-elements type input and output mechanism.

According to a further preferred form of the invention, the second engaging device is interposed between and coaxially with the second and third rotary elements.

According to a still further preferred form of the invention, the first and second engaging devices are disposed on one of axially opposite sides of the three-elements type input and output mechanism which is remote from the motor/generator.

According to a yet further preferred form of the invention, the three-elements type input and output mechanism has a smaller diameter than the motor/generator.

According to another preferred form of the invention, the first and second engaging devices are located radially inwardly of the third rotary element.

According to yet another preferred form of the invention, the casing partially defines a chamber which accommodates the three-elements type input and output mechanism and the first and second engaging devices and contains a lubricating oil for lubricating the input and output mechanism and the first and second engaging devices. In this case, the lubricating oil in the chamber may differ in properties from a lubricating oil used for the engine and the other components. In other words, the lubricating oil most suitable for the three-elements type input and output mechanism and the first and second engaging devices may be used, so that these components exhibit improved durability.

BRIEF DESCRIPTION OF THE DRAWINGS

The above and optional objects, features, advantages and technical and industrial significance of this invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
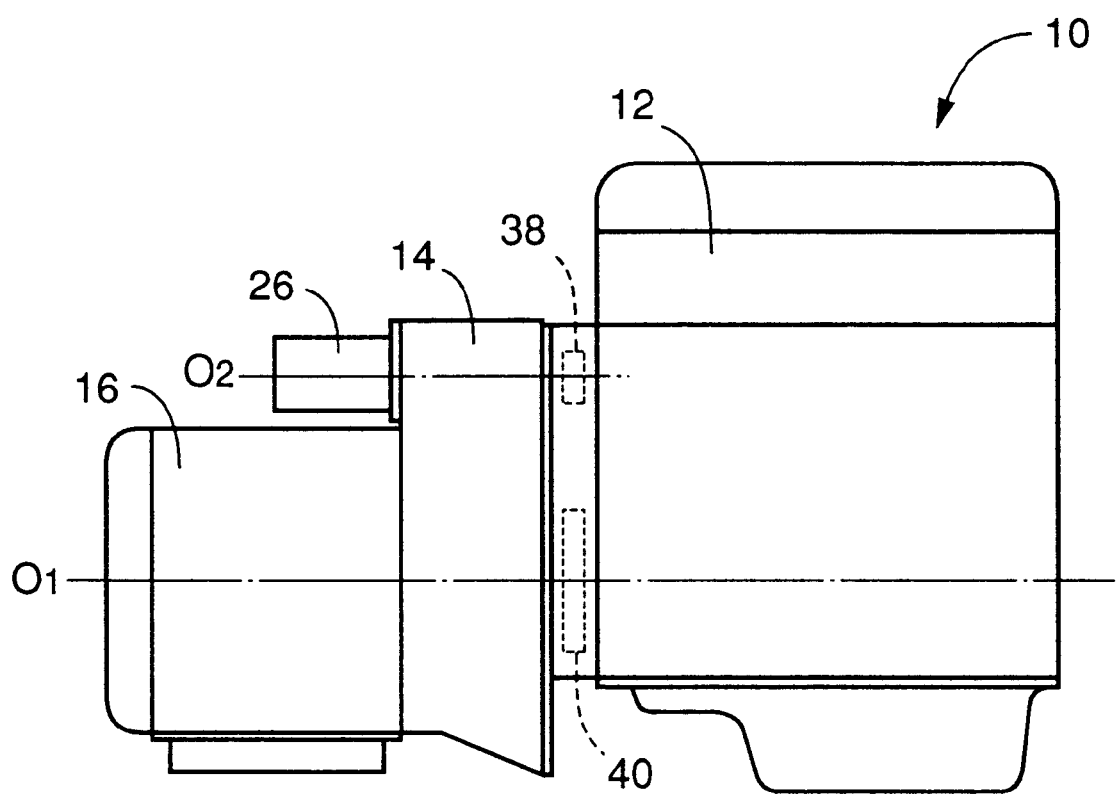
FIG. 1 is a schematic view of a power train of a front-engine front-drive automotive vehicle, which is equipped with an engine starting and electricity generating apparatus constructed according to one embodiment of this invention.
Figure 2:
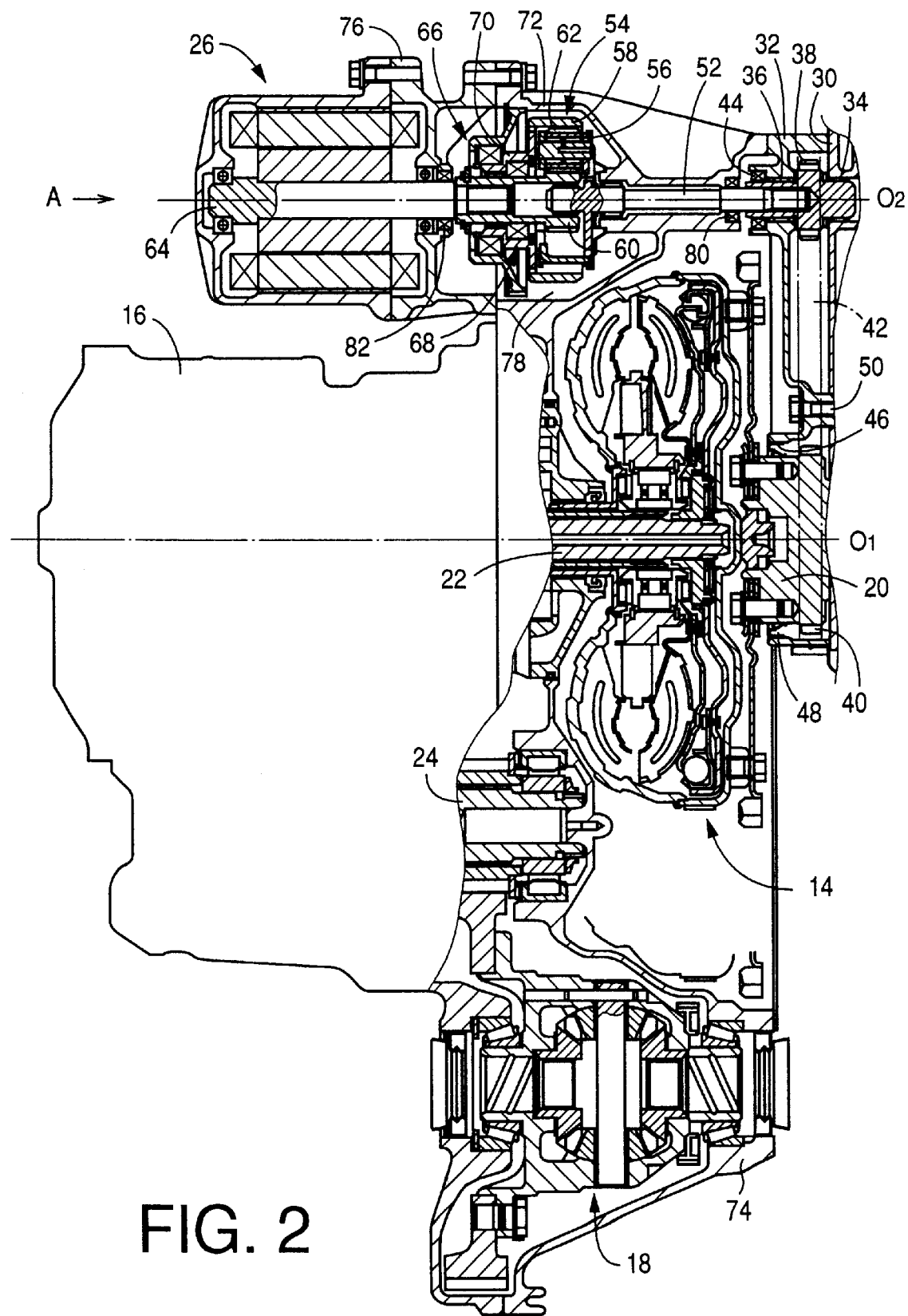
FIG. 2 is a fragmentary development elevation in cross section of the power train of FIG. 1.

Referring first to FIGS. 1 and 2, there is shown a power train 10 of a front-engine front-drive automotive vehicle. The power train 10 includes an engine 12 operated by combustion of a fuel, a torque converter 14, a transmission 16 and a differential gear device 18. A power generated by the engine 10 is transmitted to right and left drive wheels of the vehicle through the torque converter 14, transmission 16 and differential gear device 18 in this order of description. The transmission 16 has an input shaft 22 disposed coaxially with a crankshaft 20 of the engine 12. That is, the input shaft 22 is aligned with an axis O1 of rotation of the crankshaft 20. The transmission 16 includes a plurality of planetary gear sets coaxial with the axis O1, for example, and a countershaft 24 parallel with the axis O1, so that an output of the transmission 16 is transmitted to the differential gear device 18 through the countershaft 24. The countershaft 24 is spaced from the differential gear device 18, in a circumferential direction about the axis O1. A motor/generator 26 which functions as a starter motor for starting the engine 12 and an electric generator for generating electricity is disposed such that the motor/generator 26 is spaced from the countershaft 24 and the differential gear device 18 in the circumferential direction about the axis O1. The motor/generator 26 has an axis O2 parallel to the axis O1 of the crankshaft 20.

A rear upper portion of a cylinder block 30 of the engine 12 has a bearing 34, while a rear cover 32 has a bearing 36. These bearings 34, 36, which are coaxial with the motor/generator 26 having the axis O2, rotatably support a small-diameter sprocket 38. The crankshaft 20 of the engine 12 has a large-diameter sprocket 40 mounted thereon. The two sprockets 38, 40 are connected to each other by a chain 42. An oil seal 44 is interposed between the bearing 36 and a portion of the rear cover 32 located on the left side (as seen in FIG. 2) of the bearing 36 which is remote from the bearing 34, while an oil seal 44 is interposed between the crankshaft 20 and a through-hole 46 which is formed through the rear cover 32 and through which the crankshaft 20 extends. These oil seals 44, 48 provide sealing with respect to an engine oil. The rear cover 32 is fixed to the cylinder block 30 by a plurality of screws 50.

A left end portion (as seen in FIG. 2) of the small-diameter sprocket 38 is internally splined to a connecting shaft 52 coaxial with the axis O2, so that the sprocket 38 is rotated with the connecting shaft 52. Between the motor/generator 26 and the small-diameter sprocket 38, there is disposed a planetary gear device 54 of simple planetary type. The planetary gear device 54 includes a carrier 56 formed integrally with the connecting shaft 52, and has a diameter smaller than the motor/generator 26. The planetary gear device 54 further includes a ring gear 58, a sun gear 60, and a plurality of pinion gears 62 which mesh with the ring and sun gears 58, 60 and which are rotatably supported by the carrier 56. The sun gear 50 is splined to an output shaft 64 of the motor/generator 26, for rotation with the output shaft 64. The planetary gear device 54 is a three-elements type input and output mechanism consisting of a first rotary element in the form of the carrier, a second rotary element in the form of the sun gear 60 and a third rotary element in the form of the ring gear 58. The planetary gear device 54 is adapted to mechanically synthesize and distribute forces among the three rotary elements 56, 58, 60, and arranged such that the speed of rotation of the carrier 56 in a forward direction by operation of the engine 12 is reduced at a reduction ratio of $\rho/(1+\rho)$ when the sun gear 60 is rotated in the same forward direction (in the counterclockwise direction as seen in direction of arrow A shown in FIG. 2) with the ring gear 58 being held stationary. "$\rho$" represents a gear ratio of the planetary gear device 54, which gear ratio is equal to Zs/Zr, "Zs" and "Zr" representing the numbers of teeth of the sun gear 60 and ring gear 58, respectively. The torque of the carrier 56 is boosted at a boosting ratio of $(1+\rho)/\rho$, which is a reciprocal of the speed reduction ratio $\rho/(1+\rho)$.

On the axis O2 and between the planetary gear device 54 and the motor/generator 26, there are disposed a first one-way clutch 66 and a second one-way clutch 68, which are located radially inwardly of the ring gear 58. The first one-way clutch 66 is interposed between a sleeve 70 integral with the ring gear 58, and a casing 72. The first one-way clutch 66 inhibits rotation of the sleeve 70, that is, rotation of the ring gear 58 in a forward or clockwise direction (as seen in the direction of the arrow A) while allowing the rotation of the ring gear 58 in the reverse or counterclockwise direction (as seen in the direction of the arrow A). The second one-way clutch 68 is interposed between the sun gear 60 and the sleeve 70, that is, between the sun gear 60 and the ring gear 58. The second one-way clutch 68 inhibits a speed V2 of rotation of the sun gear 60 from being lower than a speed V3 of rotation of the ring gear 58 while allowing the speed V2 to be equal to or higher than the speed V3. The first and second one-way clutches 66, 68 are sprag clutches which are mechanically and automatically allowed to rotate relative to each other in one of opposite directions and inhibited to rotate relative to each other in the other direction. Each of these one-way clutches 66, 68 includes a sprag supported by an outer race. It will be understood that the first one-way clutch 66 functions as a first engaging device, while the second one-way clutch 68 functions as a second engaging device.

The casing 72 indicated above is formed as an integral part of a transmission casing 74 which accommodates the transmission 16 and the differential gear device 18. The casing 72 cooperates with a partition member 76 to define a chamber 78 in which the planetary gear device 54 and the one-way clutches 66, 68 are accommodated. This chamber 78 is fluid-tightly sealed by an oil seal 80 interposed between the casing 72 and the connecting shaft 52, and an oil seal 82 interposed between the partition member 76 and the output shaft 64. The planetary gear device 54 and the one-way clutches 66, 68 are lubricated by a suitable lubricant contained in the accommodating space 78.

In the power train 10 constructed as described above, the motor/generator 26 is operated in the forward direction as the engine starter motor when an ignition switch provided on the automotive vehicle is turned on. As a result, the sun gear 60 of the planetary gear device 54 is rotated in the forward direction, and the carrier 56, connecting shaft 52 and small-sprocket 38 are rotated in the forward direction through the first one-way clutch 66, at the speed reduction ratio of $\rho/(1+\rho)$. Further, the crankshaft 20 of the engine 12 is rotated or cranked at a speed reduction ratio "e" which is equal to the number of teeth of the small-diameter sprocket 38 divided by the number of teeth of the large-diameter sprocket 40. With the engine 12 thus operated while engine starting controls such as a fuel injection control are effected, the engine 12 can be started by the motor/generator 26. Upon starting the engine 12 by the motor/generator 26, the torque of the motor/generator 26 is boosted at a boosting ratio which is a reciprocal of the speed reduction ratio "e"×ρ/(1+ρ) of an assembly of the planetary gear device 54 and the sprockets 38, 40. Therefore, the motor/generator 26 having a relatively small capacity can rotate the crankshaft 20 to start the engine 12. When a speed $N_E$ of rotation of the crankshaft 20 becomes higher than a critical speed $N_M$×"e"× ρ/(1+ρ) after the engine 12 has been started, the ring gear 58 starts to be rotated in the forward direction. The critical speed $N_M$×"e"×ρ/(1+ρ) is a product of a speed $N_M$ of the motor/generator 26 and the speed reduction ratio "e"×ρ/(1+ρ) of the above-indicated assembly 54, 38, 40.

A battery or electricity storage device provided on the automotive vehicle can be charged by the motor/generator 26 operated as an electric generator by the torque of the engine 12 or by the kinetic energy of the running vehicle, while the regeneration of the motor/generator 26 is electrically controlled. The operation of the motor/generator 26 as the electric generator will cause a resistance to the rotary motion of the sun gear 60, which would cause the ring gear 58 to rotate at a high speed if the ring gear 58 was in a free state. However, the second one-way clutch 68 interposed between the ring gear 58 and the sun gear 60 prevents the speed V3 of the ring gear 58 from exceeding the speed V2 of the sun gear 50, so that the carrier 56, ring gear 58 and sun gear 50 of the planetary gear 54 are rotated as a unit. The speed $N_M$ of the motor/generator 26 at this time is equal to a product of a speed $N_E$ of the engine 12 and a reciprocal of the ratio "e" of the sprockets 38, 40, that is, equal to $N_E$/e. Since this speed $N_M=N_E$/e of the motor/generator 26 is not so high, the motor/generator 26 need not have large mechanical and electrical capacities, and is available at a relatively low cost.

In the present embodiment, the planetary gear device 54 and the one-way clutches 66, 68 are disposed coaxially with the motor/generator 26 having the axis O2 which is spaced apart from and parallel to the axis O1 of the crankshaft 20 of the engine 12. In this arrangement, the overall axial dimension of the assembly including the engine 12 and the other components coaxial with the engine 12 is significantly reduced. Further, the assembly including the motor/generator 26, planetary gear device 54 and one-way clutches 66, 68 has comparatively small axial and radial dimensions. Accordingly, this assembly can be disposed with a high degree of freedom in its positioning, and the power train 10 as a whole may be made compact and small-sized.

It is also noted that the planetary gear device 54 has a smaller diameter than the motor/generator 26 and that the one-way clutches 66, 68 are disposed adjacent to the planetary gear device 54 and radially inwardly of the ring gear 58. This arrangement is effective to minimize the radial dimension of the power train 10 in which the planetary gear device 54 is disposed coaxially with the motor/generator 26.

Since the second one-way clutch 68 is interposed between the sun gear 60 and the ring gear 58, the required torque capacity of the second one-way clutch 68 is smaller than where the clutch 68 is interposed between the carrier 56 and the sun gear 60 or the ring gear 58. Accordingly, the second one-way clutch 68 can be small-sized and is available at a reduced cost, so that the power train 10 can be made further compact. Suppose the torque to be transmitted from the engine 12 to the carrier 56 is represented by Tc, the required minimum torque capacity of the second one-way clutch 68 is Tc×1/(1+ρ). Where the gear ratio ρ of the planetary gear device 54 is about 0.5, for instance, the required minimum torque capacity is about 0.67 Tc in the present arrangement. If the second one-way clutch 68 was disposed between the carrier 56 and the sun gear 60, the required minimum torque capacity of the clutch 68 would be Tc. If the clutch 68 was disposed between the carrier 56 and the ring gear 58, the required minimum torque capacity would be Tc×1/ρ, that is, about 2 Tc.

The one-way clutches 66, 68 of the sprag type are advantageous in that these clutches are mechanically and automatically allowed to rotate relative to each other in one of the opposite directions and inhibited to rotate relative to each other in the other direction. In the engine starting and electricity generating apparatus disclosed in U.S. Pat. No. 5,132,604, an electromagnetic actuator is used to force a pawl onto a ratchet, and a controller is required to control the electromagnetic actuator. The present apparatus using the sprag clutches as the one-way clutches 66, 68 is simpler in construction, more economical to manufacture, and more reliable in operation without a control malfunction, than the apparatus disclosed in the above-identified publication.

Since the chamber 78 accommodating the planetary gear device 54 and the one-way clutches 66, 68 is independent of the engine 12 and transmission 16, the chamber 78 can be filled with a lubricating oil suitable for lubricating the planetary gear device 54 and the one-way clutches 66, 68, so that the durability of these components 54, 66, 68 is increased.

Figure 3:
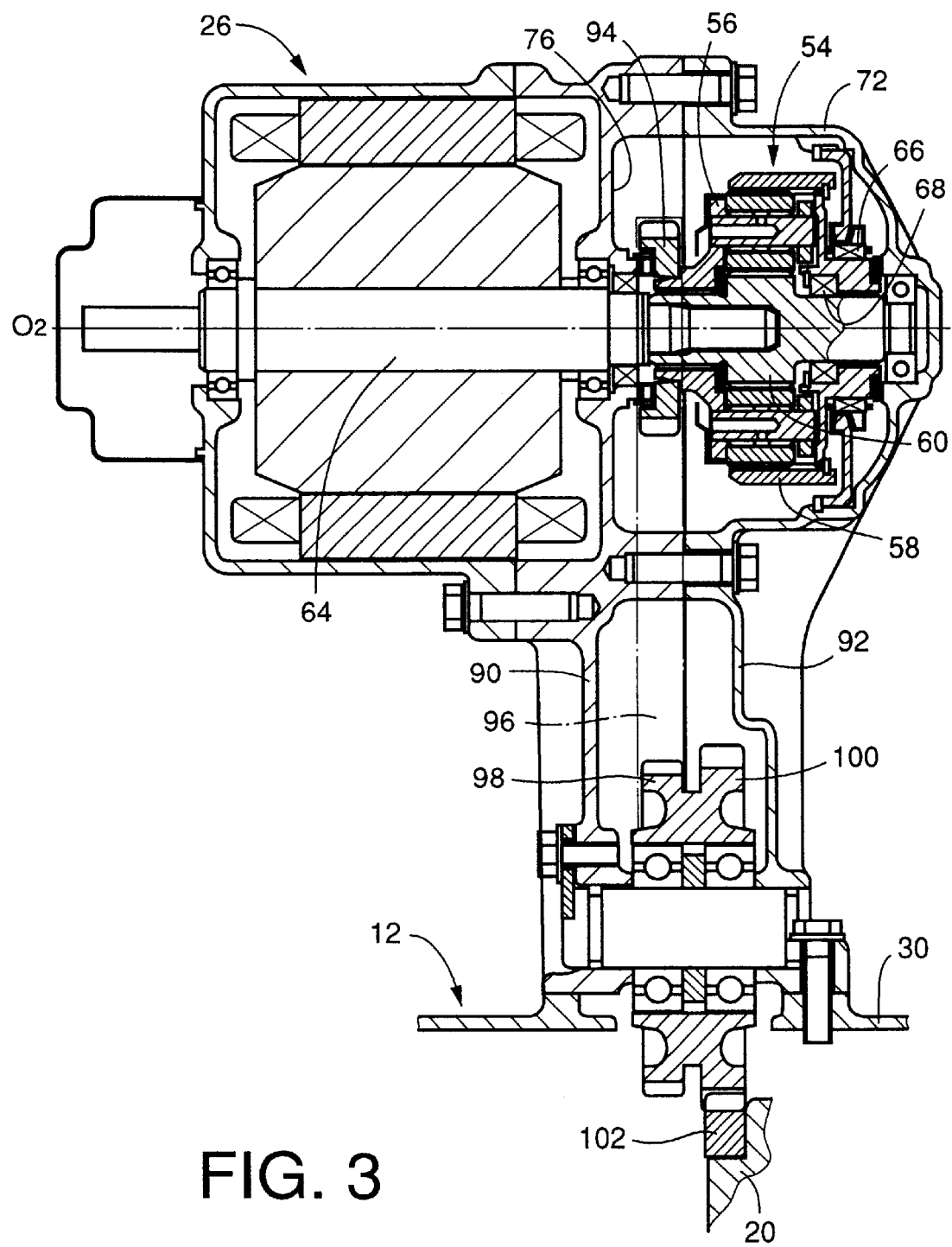
FIG. 3 is an elevation in cross section of a three-elements type input and output mechanism used in another embodiment of this invention.

Referring next to FIG. 3, there will be described a second embodiment of this invention. The same reference numerals as used in the first embodiment will be used in the second embodiment, to identify the corresponding elements, and redundant description of these elements will not be provided in the interest of brevity and simplification.

In the power train shown in FIG. 3, the assembly including the motor/generator 26 and the planetary gear device 54 is disposed such that the axis O2 of the assembly is spaced apart from and parallel to the axis O1 of the engine 12. This assembly is fixed to the cylinder block 30 of the engine 12 via two casings 90, 92. In the second embodiment, the one-way clutches 66, 68 are disposed on one of opposite sides of the planetary gear device 54 which is remote from the motor/generator 26. Between the motor/generator 26 and the planetary gear device 54, there is disposed a sprocket 94 which is fixed to the carrier 56. This sprocket 94 is connected by a chain 96 to an intermediate sprocket 98. A gear 100 is formed integrally with the intermediate sprocket 98. The gear 100 meshes with a gear 102 fixedly mounted on the crankshaft 20 of the engine 12. Thus, the carrier 56 of the planetary gear device 54 is operatively connected to the crankshaft 20.

While the presently preferred embodiments of the present invention have been described above in detail by reference to the accompanying drawings, for illustrative purpose only, it is to be understood that the invention is not limited to the details of the illustrated embodiments, but may be embodied with various changes, modifications and improvements, which may occur to those skilled in the art.

What is claimed is:

1. An engine starting and electricity generating apparatus comprising:
   an engine operated by combustion of a fuel and having a crankshaft;
   a motor/generator having an output shaft and disposed such that an axis of rotation of said motor/generator is spaced apart from and parallel to an axis of rotation of said crankshaft;

a three-elements type input and output mechanism including a first rotary element connected to said crankshaft, a second rotary element connected to said output shaft, and a third rotary element, said input and output mechanism operating to mechanically synthesize and distribute forces among said first, second and third rotary elements, and being arranged such that a speed V1 of rotation of said first rotary element in a forward direction by operation of said engine is reduced when said second rotary element is rotated in said forward direction with said third rotary element being held stationary;

a casing accommodating said three-elements type input and output mechanism;

a first engaging device, interposed between said casing and said third rotary element, for allowing at least said third rotary element to rotate in said forward direction while inhibiting said third rotary element in a reverse direction opposite to said forward direction;

a second engaging device, interposed between two elements of said first, second and third rotary elements, for inhibiting a speed V2 of rotation of said second rotary element from being lower than said speed V1 of rotation of said first rotary element while allowing said speed V2 to be equal to or higher than said speed V1, or for inhibiting said speed V1 from being lower than a speed V3 of said third rotary element while allowing said speed V1 to be equal to or higher than said speed V3;

said motor/generator being operated as an engine starter motor to rotate said second rotary element while said first engaging device inhibits said third rotary element from rotating in said reverse direction, whereby said engine is cranked and started;

said motor/generator being operated as an electric generator, during operation of said engine, with said first engaging device allowing said third rotary element to rotate in said forward direction, while said first, second and third rotary elements are rotated as a unit under an action of said second engaging device; and said three-elements type input and output mechanism being disposed coaxially with said motor/generator.

2. An engine starting and electricity generating apparatus according to claim 1, wherein said three-elements type input and output mechanism consists of a planetary gear device of simple planetary type including a carrier, a sun gear and a ring gear as said first, second and third rotary elements, respectively, said first engaging device including a first one-way clutch allowing and inhibiting the rotations of said ring gear in said forward and reverse directions, respectively, said second engaging device including a second one-way clutch interposed between said sun and ring gears.

3. An engine starting and electricity generating apparatus according to claim 1, wherein said first engaging device is disposed coaxially with and between said motor/generator and said three-elements type input and output mechanism.

4. An engine starting and electricity generating apparatus according to claim 1, wherein said second engaging device is interposed between and coaxially with said second and third rotary elements.

5. An engine starting and electricity generating apparatus according to claim 1, wherein said first and second engaging devices are disposed on one of axially opposite sides of said three-elements type input and output mechanism which is remote from said motor/generator.

6. An engine starting and electricity generating apparatus according to claim 1, wherein said three-elements type input and output mechanism has a smaller diameter than said motor/generator.

7. An engine starting and electricity generating apparatus according to claim 6, wherein said first and second engaging devices are located radially inwardly of said third rotary element.

8. An engine starting and electricity generating apparatus according to claim 1, wherein said casing partially defines a chamber in which said three-elements type input and output mechanism and said first and second engaging devices are accommodated and contains a lubricating oil for lubricating said input and output mechanism and said first and second engaging devices.

\* \* \* \* \*